United States Patent [19]

Nakayama et al.

[11] Patent Number: 4,636,588
[45] Date of Patent: Jan. 13, 1987

[54] ELECTRIC SOURCE CIRCUIT FOR TELEPHONE SETS

[75] Inventors: Yasunobu Nakayama, Musashino; Yasuji Sato, Hachioji, both of Japan

[73] Assignee: Kabushiki Kaisha Toshiba, Kawasaki, Japan

[21] Appl. No.: 706,283

[22] Filed: Feb. 27, 1985

[30] Foreign Application Priority Data

Feb. 29, 1984 [JP] Japan .................................. 59-38140
Feb. 29, 1984 [JP] Japan .................................. 59-38141
Apr. 4, 1984 [JP] Japan .................................. 59-66865

[51] Int. Cl.⁴ .......................................... H04M 19/00
[52] U.S. Cl. .................... 379/362; 379/387; 379/413
[58] Field of Search ................. 179/77, 16 A, 81 R, 179/70, 2 BC; 307/64, 66, 87

[56] References Cited

U.S. PATENT DOCUMENTS 4,360,710 11/1982 Chaput et al. .................... 179/81 R
4,532,382 7/1985 Pommer II ...................... 179/81 R
4,560,841 12/1985 Pierrel .................................. 179/77

Primary Examiner—James L. Dwyer
Attorney, Agent, or Firm—Finnegan, Henderson, Farabow, Garrett & Dunner

[57] ABSTRACT

An output voltage of a first diode deriving out an office line voltage, and an output voltage of a second diode deriving out the voltage of a back-up battery are combined and then smoothed by a smoothing capacitor. The smoothed voltage is supplied to a control circuit. A voltage limiting circuit is connected to the input side of the first limiter for limiting the upper limit of the smoothed voltage. A switch circuit is provided which is rendered conductive at the time of talking and the at the time of sending out a dial pulse for combining the office line voltage with the combined voltage. A voltage limiting circuit is also provided which is enabled only at the time of talking and at the time of sending out a dial pulse for limiting the upper limit of the combined voltage.

10 Claims, 7 Drawing Figures

ELECTRIC SOURCE CIRCUIT FOR TELEPHONE SETS

BACKGROUND OF THE INVENTION

1. Field of the Invention

This invention relates to an electric source circuit for a telephone set having a control circuit for accessing a dial transmission circuit, effecting key input reception from a dial key pad, setting of the state of a talking line, etc., and more particularly an electric source circuit provided with a battery acting as a back-up power source for memory means for storing control data of the control circuit.

2. Description of the Prior Art

Various types of multifunction electric button telephone apparatus utilizing microprocessors have recently been developed. In these telephone sets, obtaining an electric source for driving the microprocessor, presents a problem. Since an appropriate electric source capable of stably supplying power to such electronic button telephone apparatus is not yet available, a commercial power source has been exclusively used. However, where a commercial power source is used, it is necessary to use connecting lines for connecting the telephone sets to the commercial power source. Moreover, circuit means for stepping down the voltage of the commercial source to the driving voltage of the microprocessor and for rectifying the commercial AC voltage requires a large amount of space which prevents miniaturization of the entire apparatus and increases the cost of manufacturing.

For this reason, a telephone apparatus has been proposed in which office line current is used and a battery is provided acting as a back-up source for the memory means or the like of the apparatus. In such a telephone apparatus, however, there is a problem of how to minimize the degradation or consumption of the back-up battery so as to lengthen its effective life.

Among the reasons that cause shortening of the effective life of the back-up battery are the leakage of the battery while speech is not made (idle time) and consumption of the battery caused by the drop of the office line voltage. The leakage of the back-up battery during idle time is mainly caused by the current flowing through a Zener diode constituting a voltage limiting circuit which is provided for the purpose of stabilizing the source voltage. More particularly, the Zener diode is connected to a line where the output of the back-up battery and the output of the office line voltage flow so that the output battery of the back-up voltage is constantly applied across the Zener diode. Although the operating voltage of the Zener diode is generally set to be slightly higher than the output voltage of the back-up battery, a small current flows through the Zener diode even in a range lower than the operating or yielding voltage of the Zener diode. Thus, this small current is one of the causes that rapidly consume the back-up battery.

Usually the office line voltage is derived out through a plurality of diodes and transistors. However, a diode has a forward voltage drop of about 0.7 V and a transistor has a voltage drop of about 0.01 V–0.3 V. Moreover, the office line voltage often decreases to about 3 V due to the connection state of other telephone sets. In such a case, it becomes impossible to drive a microprocessor or the like with the office line voltage. For this reason, provision of the back-up battery is essential.

SUMMARY OF THE INVENTION

It is an object of this invention to provide a novel electric source circuit capable of lengthening the operating life of a back-up battery by minimizing as far as possible the consumption thereof.

According to this invention, there is provided a source circuit for a telephone set comprising first diode means deriving out an office line voltage; a back-up battery; second diode means for deriving out an output voltage of the back-up battery; a smoothing capacitor connected to a line supplied with the outputs of the first and second diode means for smoothing a combined output voltage of the first and second diode means; a voltage limiting circuit connected to the input side of the first diode means, for preventing the combined output voltage from exceeding a predetermined definite voltage; and means for supplying the smoothed voltage to a control circuit which controls a dial pulse sending out operation and a talking operation, the smoothed voltage acting as a source voltage for the control circuit.

According to a modified embodiment of this invention, there is provided a source circuit for a telephone set comprising a back-up battery; first circuit means including a first diode for deriving out an office line voltage, a second diode for deriving out the voltage of the back-up battery and first smoothing means for smoothing a combined voltage of the output voltages of the first and second diodes; second circuit means including a third diode for deriving out the office line voltage; a fourth diode for deriving out the output voltage of the back-up battery, and a second smoothing means for smoothing a combined voltage of the output voltages of the third and fourth diodes; a Zener diode connected to the input sides of the first and third diodes and acting as a voltage limiter; a current limiting circuit connected to the input side of the fourth diode of the second circuit means; a control circuit including memory means and a control unit; means for supplying the output of the first circuit means to the memory means, and means for supplying the output of the second circuit means to the control unit.

According to still further embodiment of this invention, there is provided a source circuit for a telephone set comprising a back-up battery; a first diode for deriving out an office line voltage; a second diode for deriving out the output voltage of the back-up battery; a smoothing capacitor connected to a line supplied with the outputs of the first and second diodes for smoothing a combined voltage of the output voltages of the first and second diodes; a current limiting circuit connected to the input side of the second diode for limiting current flowing through the second diode; a negative voltage forming circuit for forming a negative source voltage from a combined voltage of the output voltages of the first and second diodes; a control circuit including a control unit and memory means; means for supplying the combined voltage to the control unit; and means for supplying the output of the negative voltage forming circuit to the memory means.

DESCRIPTION OF THE PREFERRED EMBODIMENTS

Figure 1:
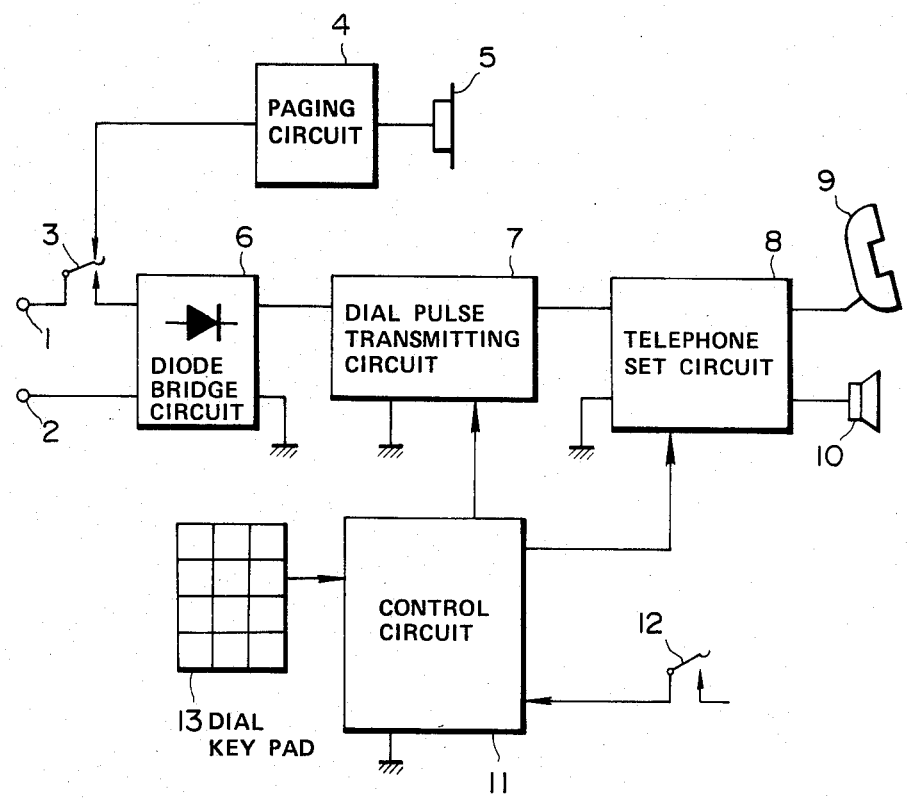
FIG. 1 is a block diagram showing one example of the general construction of an office source type telephone set.

FIG. 1 shows the general construction of an office source type telephone set (telephone set using a office line current as an electric source) having a control circuit including a microprocessor. The telephone set comprises office line terminals 1 and 2 and a hook switch 3 which is thrown to a paging circuit 4, as shown in FIG. 1, in a paging signal waiting state, so as to send the paging signal to a paging circuit 4 upon receipt of the paging signal to cause a sounder or loudspeaker to generate a paging tone. On the other hand, at the time of transmitting a dial signal and at the time of talking, the hook switch 3 is thrown to the side of a diode bridge circuit 6 so that a talking signal from a telephone set of a calling party is sent to a telephone set circuit 8 via the diode bridge circuit 6 and a dial pulse transmitting circuit 7. The telephone set circuit 8 sends the received talking signal to a handset 9 or reception monitor loudspeaker 10 to be produced as a voice. A control circuit 11 is provided for controlling the dial signal transmitting operation and the talking operation. The control circuit 11 is supplied with the output of a hook switch contact 12 interlocked with the hook switch 3 and the output of a dial key pad 13 for controlling the sending out of the dial pulse, the operation of the telephone set circuit 8 at the time of talking, switching between the transeiver 9 and the reception monitor loudspeaker 10 and for preventing excessively loud tone at the time of transmitting the dial pulse.

Figure 2:
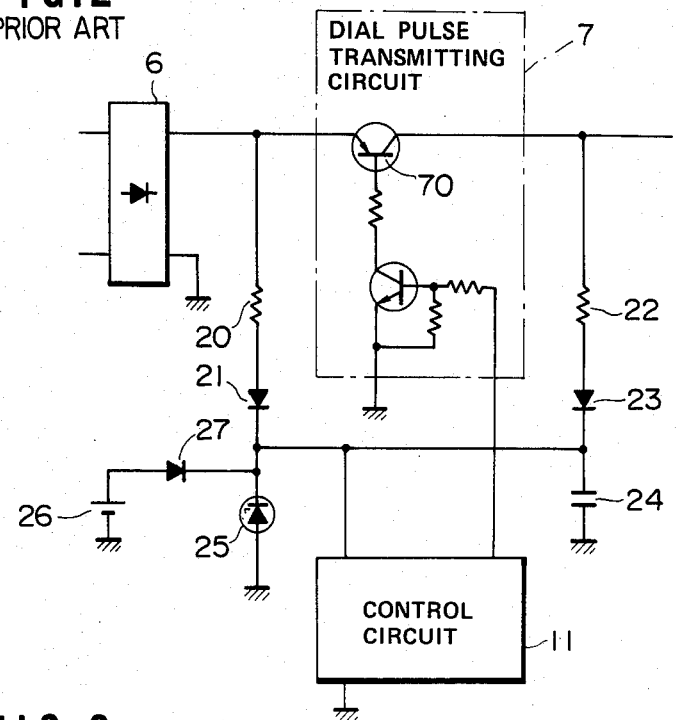
FIGS. 2 and 3 are block diagrams showing prior art source circuits.

FIG. 2 shows the construction of a prior art source circuit for operating the control circuit 11. As shown, the output of the diode bridge circuit 6 is connected to a first diode 21 through a resistor 20 for deriving out the office source voltage at the time of talking. The output of the diode bridge circuit 6 is also supplied to the dial pulse transmitting circuit 7, and its output is supplied to a second diode 23 via a resistor 22 so as to derive out the office source voltage via the dial pulse transmitting circuit 7 at the time of transmitting the dial pulse and during talking. The office source voltages thus derived out are combined on the output sides of the diodes 21 and 23 and the combined voltage is smoothed with a smoothing capacitor 24 and its magnitude is limited to a constant value by a Zener diode 25, whereby the constant voltage is supplied to the control circuit 11. In this case, for providing a back-up voltage to memory means, not shown, in the control circuit 11, the output voltage of a back-up battery 26 is also combined with the output voltages of the diodes 21 and 23 via a diode 27.

Figure 3:
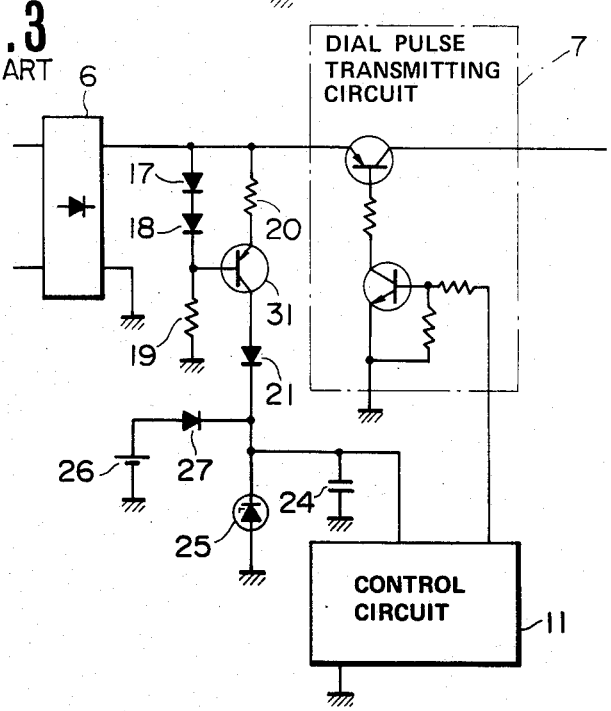

In another prior art source circuit shown in FIG. 3 a constant current circuit is constituted by diodes 17 and 18 and a transistor 31, and the output of the constant current circuit is derived out through a diode 21 and its output is combined with the output of a backup battery 26 via a a diode 27. The combined voltage is smoothed by a smoothing capacitor 24 and maintained at a constant value by a Zener diode 25. The voltage thus obtained is supplied to the control circuit 11 as a source voltage.

In the source circuit having a construction just described, since the voltage of the back-up battery 26 is normally impressed across the Zener diode 25 provided for the purpose of maintaining the office source voltage at a constant value, even when the voltage of the battery 26 is higher than the operating voltage of the Zener diode, a small current would flow through the Zener diode 25 from the battery 26 in a region below the operating point of the Zener diode, whereby the battery is rapidly consumed.

Figure 4:
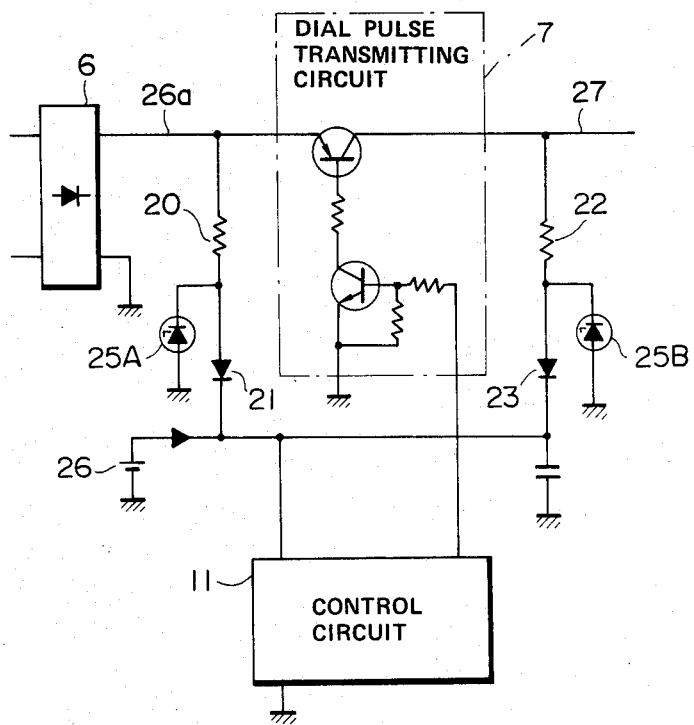
FIG. 4 is a block diagram showing one embodiment of the source circuit for use in a telephone set according to this invention.

The embodiment of this invention shown in FIG. 4 is different from the prior art circuit shown in FIG. 2 in that independent Zener diodes 25A and 25B acting as voltage limiters that present the office source voltage from exceeding a definite voltage are connected to the input sides of the diodes 21 and 23 respectively. With this connection, the output of the back-up battery 26 becomes opposite to the forward direction of diodes 21 and 23 so that there is no fear that the current of the battery leaks through Zener diodes 25A and 25B, thus preventing unwanted consumption of battery 26. A DC voltage of 48 V–100 V is applied to a wire 26a connected to resistor 20 at the initial time of line connection and at the time of sending out the dial pulse, while a DC voltage of 24 V–10 V is applied to a wire 27 connected to resistor 22 at the time of talking. However, since independent Zener diodes 25A and 25B are connected to the input sides of diodes 21 and 23, it is possible to limit the leakage of the office source in regions below the operating points of respective Zener diodes. Other circuit elements shown in FIG. 4 identical to those shown in FIG. 2 are designated by the same reference characters.

Figure 5:
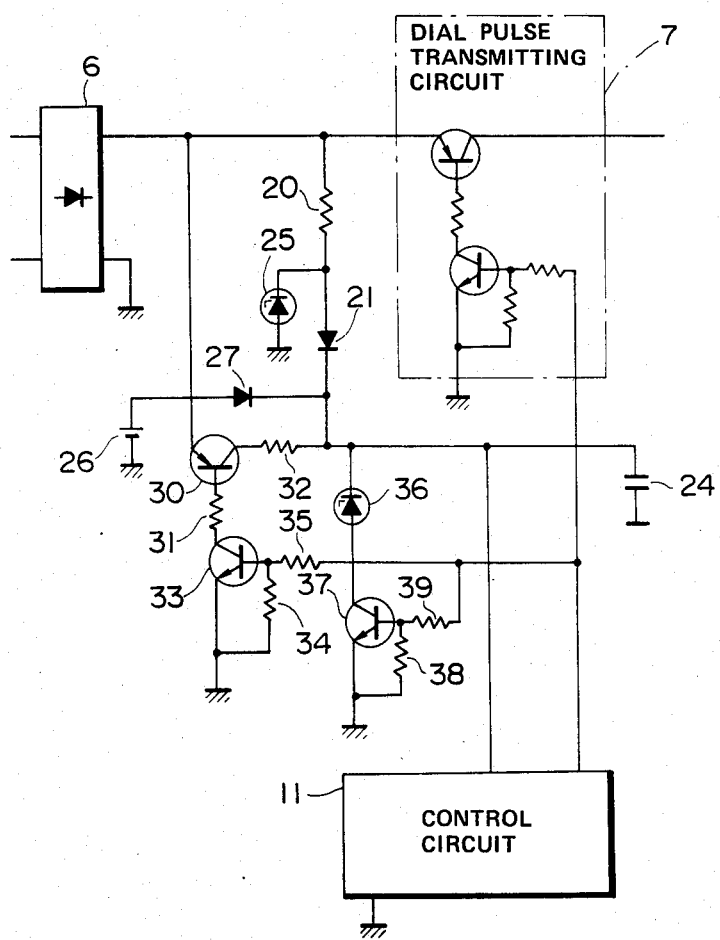
FIGS. 5-7 are block diagrams showing other embodiments of the telephone source circuit according to this invention.

Another embodiment of this invention shown in FIG. 5 is different from the prior art circuit shown in FIG. 3 in that Zener diode 25 which has been connected to the output side of diode 21 is connected to the input side of diode 21 and, at the time of sending out the dial pulse, the office source voltage is derived out through a transistor 30 and then combined with the output of diode 21 via a resistor 32. Furthermore, for the purpose of limiting the office source voltage to a definite value, a second Zener diode 36 is connected to the junction between resistor 32 and diode 21 and the second Zener diode 36 is rendered operative by a transistor 33 only at the time of sending out the dial pulse and at the time of talking. In this case, a transistor 30 is turned ON by a transistor 33 at the time of sending out the dial pulse and at the time of talking. Reference numerals 31, 34, 35, 38 and 39 show resistors connected as shown.

With this construction, in a path including the diode 21, a voltage drop of only about 0.7 V occurs, and in a path including the transistor 30, a voltage drop is only 0.2 V. For this reason, it is not only possible to decrease loss of the office source voltage but also to supply a stable source voltage to the control circuit 11. In the prior art circuit shown in FIG. 3, the output voltage of the back-up battery 26 is always impressed across the Zener diode 25, whereas in this embodiment, the battery voltage is blocked by diode 21. Moreover, since the second Zener diode 36 also operates only at the time of sending out the dial pulse and at the time of talking, the voltage of the back-up battery 26 would not be constantly applied across the Zener diode 36. For this reason, a small current from battery 26 does not flow through the Zener diodes 25 and 36 in regions belows the operating points thereof, thereby decreasing consumption of the battery 26.

The Zener diode 36 may be connected to the emitter electrode of transistor 30.

Figure 6:
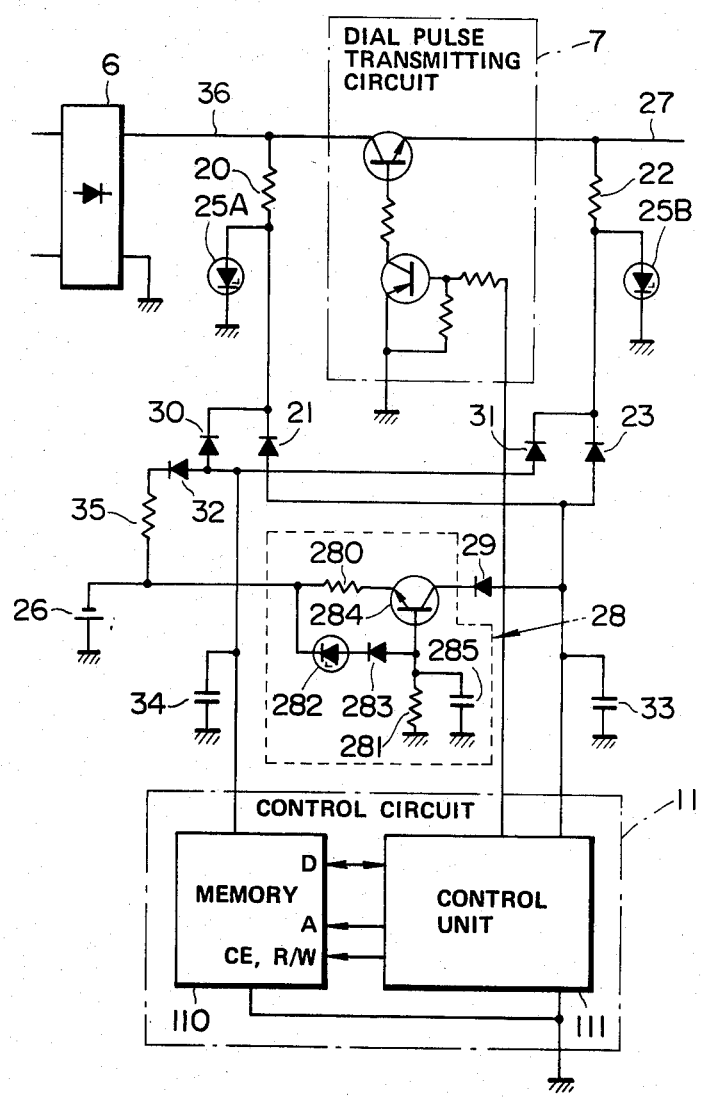

FIG. 6 shows still another embodiment of this invention which is constructed to limit consumption of the back-up battery and to improve the noise-proof characteristic of the memory means of the control circuit 11. In this embodiment, the source voltages for a control unit 111 of the control circuit 11 and a memory unit 110 are separately derived out. More particularly, the negative office source voltage is derived out by a first pair of diodes 21 and 23 with their cathode electrodes connected to the office line and smoothed by a capacitor 33. The smoothed voltage is then supplied to the control unit 111. In the same manner, the negative office source voltage is derived out by a second pair of diodes 30 and 31 with their cathode electrode connected to the office line, smoothed by a capacitor 34 and then supplied to the memory unit 110. The negative voltage of the back-up battery 26 is applied to the anode electrodes of diodes 30 and 31 via a resistor 35 and a diode 32. The negative voltage of the battery 26 is also applied to the anode electrodes of the diodes 21 and 23 though a current limiting circuit 28 via diode 29. The current limiting circuit 28 is made up of resistors 280 and 281, a Zener diode 282, a diode 283, a transistor 284, and a smoothing capacitor 285 and the Zener voltage or the operating voltage of the Zener diode 282 determines the value of the limited current. 35 shows a current limiting resistor for preventing latch up of the memory unit 110.

The Zener diodes 25A and 25B acting as voltage limiters are connected to the input or anode sides of diodes 21 and 23 respectively.

Since this embodiment is constructed to derive out the negative office source voltage, the transistor of the dial pulse transmitting circuit 7 has a polarily opposite to those of FIGS. 4 and 5.

In this embodiment, since the output polarity of the back-up battery 26 is opposite to the forward direction of the diodes 21, 23, 30 and 31, there is no leakage of the battery 26 through Zener diodes 25A and 25B, thus preventing consumption of the battery. A DC voltage of 48 V–100 V is applied to wire 36 connected to resistor 20 at the time of initial connection of the office line and at the time of sending out the dial pulse, while a DC voltage of 24 V–10 V is applied to line 27 connected to resistor 22 but since independent Zener diodes 25A and 25B are connected to the input sides of diodes 21, 23, 30 and 31 respectively, it is possible to minimize the leakage of the office source in regions below the operating points of the Zener diodes 25A and 25B.

Moreover, since the control circuit 11 is fed with power from a negative source with its ground potential maintained at a high potential, the chip enable signal $\overline{CE}$ and the read/write signal R/W of the memory unit 110 are shifted to an inoperative side at the time of generating external noise (that is a $\overline{CE}$ terminal becomes "H" level to select a chip, while a R/W terminal becomes "H" level to assume R side), thereby improving the noise resistant characteristic. Moreover, since the source voltage systems of the control unit 111 and the memory unit 110 are separate, even when the source voltage for the control unit 111 becomes the same or lower than the voltage necessary for the memory unit 110, the operation thereof would not be adversely effected. Consequently, the memory unit can hold such data as abbreviated dial numbers or the like without destructing them. In addition, since the current supplied to the control unit 111 from the battery 26 is limited to an order of several microamperes by the current limiting circuit 28, it is possible to further minimize abnormal consumption of the battery 26 (about several 100 $\mu$A to several mA)

As above described, since a Zener diode is used for the current limiting circuit and the leakage current in the forward direction of the Zener diode is smaller than that of an ordinary diode, the current consumption can be limited to an order of only several microamperes.

Figure 7:
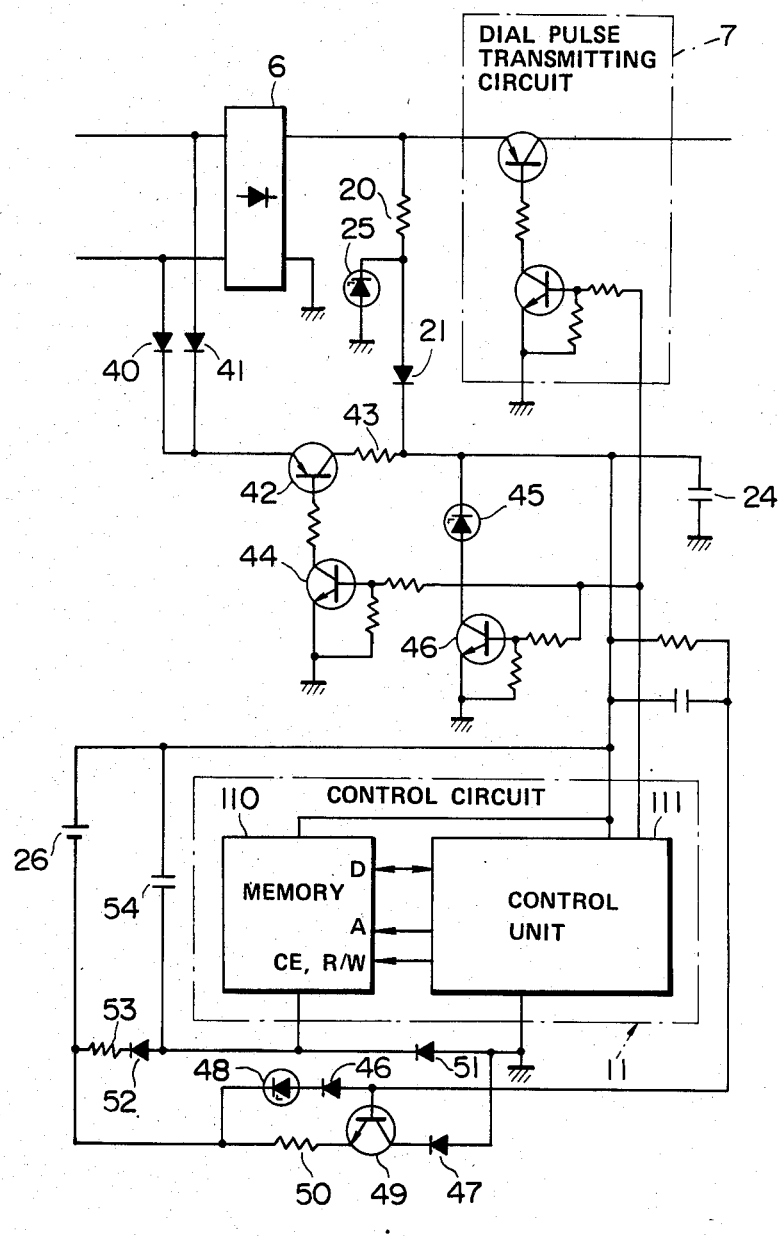

In a still further embodiment of this invention shown in FIG. 7, a positive source voltage is supplied to the control unit 111, a negative source voltage is supplied to the memory unit 110, and the office source voltage is directly derived out from the input side of the diode bridge circuit 6 for eliminating the effect of voltage drop caused thereby.

More particularly, the positive office source voltage is derived out through resistor 20, Zener diode 25 and a first diode 21, and the positive office source voltage is also directly derived out through diodes 40 and 41 connected to the input side of the diode bridge circuit 6, the derived out voltage is combined with the output voltage of the diode 21 through a transistor 42 and a resistor 43. After limiting the combined voltage to a definite voltage with a Zener diode 45, the definite voltage is supplied to the control unit 111 as a source voltage. The output voltage of the back-up battery 26 is supplied to a second diode 47 via a current limiting circuit constituted by a diode 46, a Zener diode 48, a transistor 49 and a resistor 50, and the output voltage of the back-up battery 26 is also supplied to the control unit 111. Diodes 51 and 52 and a resistor 53 are serially connected between the negative terminal of the battery and the ground, and a negative potential is derived out from the junction between the diodes 51 and 52. After being smoothed by a capacitor 54, the derived out voltage is supplied to the memory unit 110 as a source voltage.

A transistor 42 is turned ON when transistor 44 is turned ON at the time of sending out the dial pulse. A Zener diode 45 is connected to the ground via a transistor 46 which is turned ON when the dial pulse is sent out. Consequently, the office source voltage is derived out through diodes 40 and 41 only at the time of sending out the dial pulse and limited to the definite voltage by the Zener diode 45, and the output of this Zener diode is combined with the output of diode 21.

With the construction shown in FIG. 7, since the office source voltage is derived out also from the input side of the diode bridge circuit 6, a decrease in the source voltage corresponding to the voltage drop of the diode bridge circuit can be efficiently compensated for. Moreover, since the memory unit 110 is operated by the negative source voltage, upon occurrence of an external noise, the chip enabling signal $\overline{CE}$ and the read/write signal R/W of the memory unit 110 would not be shifted to inoperative side. Accordingly, the memory unit can hold such data as compressed dial numbers without destruction. Moreover, since Zener diode 25 acting as a voltage limiter is connected to the input side of diode, the consumption of the battery 26 can be suppressed.

In the foregoing embodiments, although the office source voltage was derived out at the time of sending out the dial pulse, if desired such construction can be eliminated.

What is claim is:

1. A source circuit for a telephone set for generating an office line voltage comprising:
   a dial pulse transmitting circuit;
   control circuit means, inclding a control unit and a memory, for controlling a dial pulse transmission operation and a talking operation;
   a back-up battery;
   first diode means for deriving said office line voltage at times of talking;
   second diode means for deriving said office ling voltage via said dial pulse transmitting circuit at times of initial line connection and dial pulse transmission, output voltage of said first and second diode means being connected to provide a combined output voltage;
   third diode means for deriving an output voltage from said back-up battery;
   a smoothing capacitor receiving outputs of said first, second and third diode means and smoothing said combined output voltage of said first and second diode means;
   first voltage limiting circuit means, connected to an input of said first diode means, for preventing said combined output voltage from exceeding a predetermined voltage level;
   second voltage limiting circuit means, connected to an input of said second iode means for preventing said combined output voltage from exceeding said predetermined voltage level; and
   means for supplying said smoothed combined output voltage to said control circuit means, said smoothed combined output voltage acting as a source voltage for said control circuit means.

2. The source circuit according to claim 1, wherein said first, second and third diode means are connected to derive a negative office line voltage and a negative back-up battery voltage.

3. The source circuit according to claim 1, wherein each of said first and second voltage limiting circuit means comprises a Zener diode.

4. A source circuit for a telephone set for generating an office line voltage comprising:
   control circuit means, including a control unit and a memory, for controlling a dial pulse transmission operation and a talking operation;
   a back-up battery;
   first diode means for deriving said office line voltage at times of talking;
   second diode meand for deriving an output voltage from said back-up battery, output voltages of said first and second diode means being connected to provide a combined output voltage;
   first voltage limiting circuit means, connected to an input of said first diode means, for preventing said combined output voltage from exceeding a predetermined voltage level;
   a first switch circuit being conductive at times of talking and at times of transmitting said dial pulse, for deriving said office line voltage;
   second voltage limiting circuit means;
   a second switch circuit, rendered conductive only at times of talking and at times of transmitting said dial pulse, for enabling said second voltage limiting circuit means;
   a smoothing capacitor connected to the outputs of said first and second diode means for smoothing said combined output voltage; and
   means for supplying said smoothed voltage to said control circuit, said smoothed voltage acting as a source voltage for said control circuit.

5. The souce circuit according to claim 4, wherein said first switch circuit derives said office line voltage through a diode bridge circuit.

6. The source circuit according to claim 4, wherein said first diode means derives said office line voltage through a diode bridge circuit, and said first switch circuit derives said office line voltage from an input of said diode bridge circuit via a first diode.

7. The source circuit according to claim 4, wherein each of said first and second voltage limiting circuit means comprises a Zener diode and each of said first and second switch circuits comprises a transistor.

8. A source circuit for a telephone set for generating an office line voltage comprising:
   a back-up battery;
   first circuit means including a first diode for deriving said office line voltage, a second diode for deriving an output voltage from said back-up battery and first smoothing means for smoothing a combined output voltage of said first and second diodes;
   second circuit means including a third diode for deriving said office line voltage, a fourth diode for deriving an output voltage of said back-up battery, and a smoothing means for smoothing a combined output voltage of said third and fourth diodes;
   a Zener diode connected to input sides of said first and third diodes and acting as a voltage limiter;
   a current limiting circuit connected to an input side of said fourth diode;
   a control circuit including memory means and a control unit;
   means for supplying an output of said first circuit means to siad memory means; and
   means for supplying an output of said second circuit means to said control unit.

9. A source circuit for a telephone set for generating an office line voltage comprising:
   a back-up battery supplying an output voltage;
   a first diode for deriving said office line voltage;
   a second diode for adding said output voltage of said back-up battery to an output of said first diode;
   control circuit means including a memory section and a control section, for controlling a dialing operation and a speech operation;
   voltage limiting circuit means for regulating the added voltage of the office line voltage and the back-up battery at a constant level and for supplying the regulated voltage to said control circuit;
   current limiting circuit means disposed between the output of said voltage limiting circuit means and the input of said first diode, for limiting an amount of current fed to the input of said first diode; and
   circuit means including a third diode, a resistor and a capacitor, for producing a negative voltage from said added voltage, wherein said control section is supplied said added voltage while said memory section is supplied said negative voltage.

10. The source circuit according to claim 9, wherein said current limiting circuit means comprises a transitor with a base supplied with the output of the back-up battery via a Zener diode and a diode with an emitter supplied with the output of the back-up battery via a resistor.

* * * * *